United States Patent
Aaronson et al.

(10) Patent No.: US 9,529,577 B2
(45) Date of Patent: Dec. 27, 2016

(54) METHOD OF DEPLOYING A CONTEXTUALLY DEPENDENT APPLICATION

(75) Inventors: Benjamin Aaronson, London (GB); Martin Brown, Hursley (GB); Alexander Irving, Merseyside (GB); Anthony P. Papageorgiou, Winchester Hants (GB); Jeremy Taylor, Buckinghamshire (GB); Caroline Yeomans, Surrey (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 185 days.

(21) Appl. No.: 13/821,988

(22) PCT Filed: Sep. 9, 2011
(Under 37 CFR 1.47)

(86) PCT No.: PCT/EP2011/065598
§ 371 (c)(1),
(2), (4) Date: Oct. 21, 2013

(87) PCT Pub. No.: WO2012/032137
PCT Pub. Date: Mar. 15, 2012

(65) Prior Publication Data
US 2014/0089913 A1 Mar. 27, 2014

(30) Foreign Application Priority Data
Sep. 10, 2010 (EP) .................................. 10176184

(51) Int. Cl.
*G06F 9/44* (2006.01)
*G06F 9/445* (2006.01)
(52) U.S. Cl.
CPC .. *G06F 8/61* (2013.01); *G06F 8/62* (2013.01)

(58) Field of Classification Search
CPC ..................................... G06F 8/62; G06F 8/65
(Continued)

(56) References Cited

U.S. PATENT DOCUMENTS 7,206,828 B1   4/2007   Bourke-Dunphy et al.
8,285,199 B2   10/2012  Hsu et al.
(Continued)

FOREIGN PATENT DOCUMENTS

TW   200919315 A   5/2009

OTHER PUBLICATIONS

International Search Report and Written Opinion mailed Nov. 2, 2012; International Application No. PCT/EP2011/065598, International filed Sep. 9, 2011, 10 pages.

(Continued)

*Primary Examiner* — Duy Khuong Nguyen
(74) *Attorney, Agent, or Firm* — Cantor Colburn LLP; Damion Josephs (57) ABSTRACT

Embodiments are directed to a method and apparatus for deploying a contextually dependent application on a mobile device. A method includes determining a current location of a mobile device and gathering environmental data from the mobile device. The method also includes inferring from the current location of the mobile device and the gathered environmental data an operating environment of the mobile device and receiving a list of applications, wherein the list of applications includes metadata for each of the applications. The method further includes analyzing the metadata to identify an application that has characteristics that are compatible with the operating environment of the mobile device and installing the identified application on the mobile device.

14 Claims, 6 Drawing Sheets

(58) Field of Classification Search
USPC .......................................................... 717/174
See application file for complete search history.

(56) References Cited

U.S. PATENT DOCUMENTS

| | | | |
|---|---|---|---|
| 8,515,412 B2* | 8/2013 | Choi-Grogan | G06F 8/65 |
| | | | 455/413 |
| 2002/0155828 A1* | 10/2002 | Tuomainen | H04L 29/12783 |
| | | | 455/414.1 |
| 2002/0184619 A1* | 12/2002 | Meyerson | 717/173 |
| 2005/0222918 A1 | 10/2005 | Vanska et al. | |
| 2006/0101449 A1* | 5/2006 | Gatz | G06F 8/61 |
| | | | 717/168 |
| 2007/0226343 A1 | 9/2007 | Bishop | |
| 2009/0187659 A1* | 7/2009 | Savoure | H04L 67/306 |
| | | | 709/226 |
| 2009/0215466 A1* | 8/2009 | Ahl et al. | 455/456.1 |
| 2011/0125838 A1* | 5/2011 | Rao | G06Q 30/02 |
| | | | 709/203 |
| 2012/0096435 A1* | 4/2012 | Manolescu | G06Q 30/02 |
| | | | 717/121 |
| 2012/0129544 A1* | 5/2012 | Hodis | H04W 48/04 |
| | | | 455/456.1 |

OTHER PUBLICATIONS

Sim, Dong-Uk, et al.; "Design of Novel Dipole-Type Tag Antennas Using Electromagnetic Bandgap (EBG) Surface for Passive RFID Applications"; IEEE; p. 1333-1336; 2007.

* cited by examiner

METHOD OF DEPLOYING A CONTEXTUALLY DEPENDENT APPLICATION

CROSS REFERENCE TO RELATED APPLICATIONS

This is a U.S. National Stage of Application No. PCT/EP2011/065598, filed on Sep. 9, 2011; priority under 35 U.S.C. §119(a) and 35 U.S.C. §365(b) is claimed from European Patent Application No. 10176184.9, filed Sep. 10, 2010, and all the benefits accruing therefrom under 35 U.S.C. §119, the contents of which in its entirety are herein incorporated by reference.

BACKGROUND

The present invention relates generally to location based services. In particular, the present invention provides a method and an apparatus for contextual application deployment for mobile devices.

Currently, mobile devices use a model of application deployment by which the user locates applications for use on a mobile device by actively having to search for each application. For example, this is typically achieved by accessing an application store and manually searching for an application of interest.

Although this model is suitable for some types of applications, which are not, for example, location specific or time dependent, for example games, music etc., this type of deployment model does not work for applications that are location specific or time dependent. These types of applications are termed situational applications. Examples of situational applications are applications for ordering food from a seat at a local restaurant or café or informing one what type of activities are available when one enters a theme park.

There are many problems encountered when trying to use a traditional application deployment model for situational applications. These problems range from a user not knowing that an application which is relevant to their situation exists, or the user may know about the application but must be able to use it within a certain time period.

SUMMARY

Embodiments include a method of deploying a contextually dependent application on a mobile device. The method includes determining a current location of a mobile device and gathering environmental data from the mobile device. The method also includes inferring from the current location of the mobile device and the gathered environmental data an operating environment of the mobile device and receiving a list of applications, wherein the list of applications includes metadata for each of the applications. The method further includes analysing the metadata to identify an application that has characteristics that are compatible with the operating environment of the mobile device and installing the identified application on the mobile device.

Embodiments also include an apparatus for deploying a contextually dependent application on a mobile device. The apparatus includes an environmental data gathering component for determining a current location of the mobile device and an environmental data gathering component for gathering environmental data from the mobile device. The apparatus also includes an inference engine inferring from the current location of the mobile device and the gathered environmental data an operating environment of the mobile device. The apparatus further includes a cache update component for receiving a list of applications, wherein the list of applications includes a metadata for each of the applications. The apparatus also includes an inference engine analysing the metadata to identify an application that comprises characteristics that are compatible with the operating environment of the mobile device and an installation manager for installing the identified application on the mobile device.

BRIEF DESCRIPTION OF THE SEVERAL VIEWS OF THE DRAWINGS

Embodiments of the invention will now be described, by way of example only, with reference to the accompanying drawings in which.

DETAILED DESCRIPTION

Figure 1:
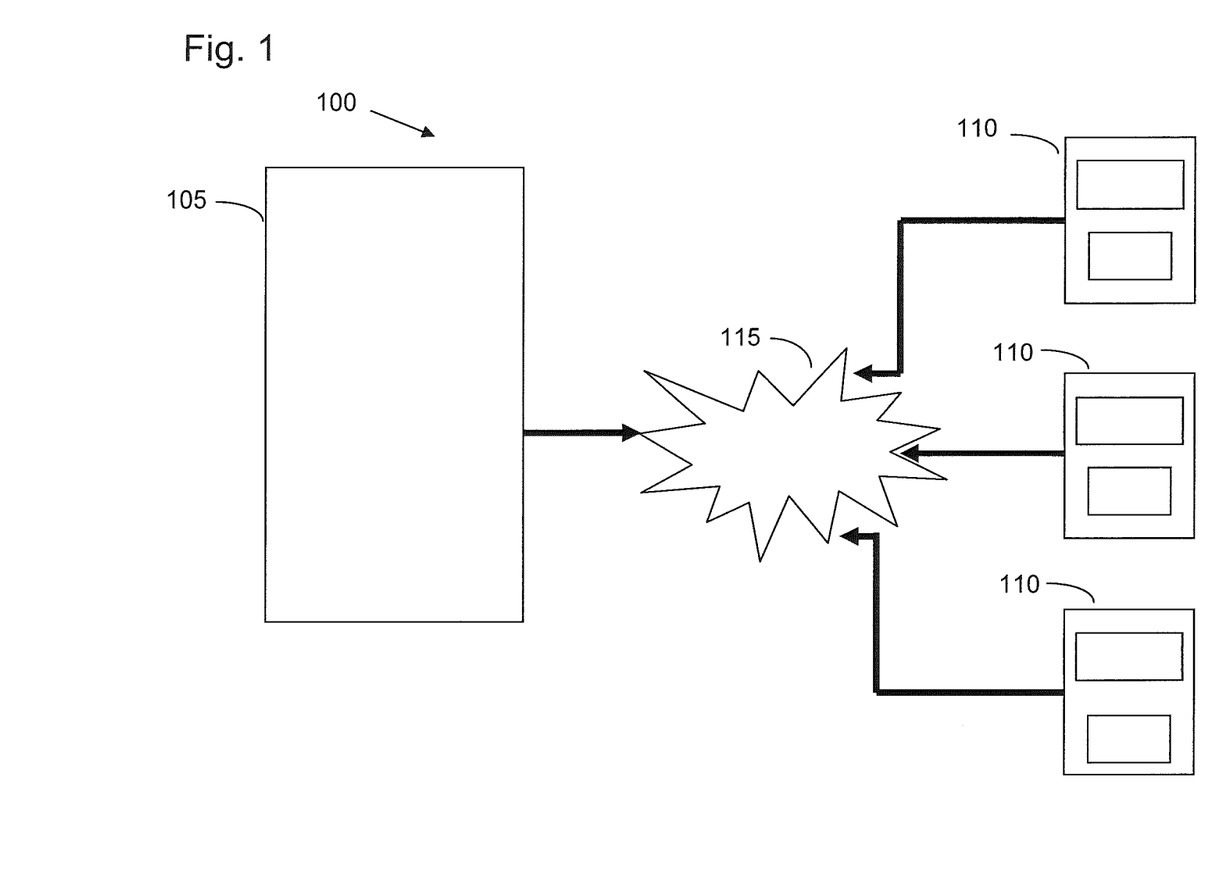
FIG. 1 is a client server architecture in which the present invention can be embodied.

FIG. 1 illustrates a client and server architecture that form a data processing environment 100 in which the present invention may be deployed. The server 105 comprises a number of processing components for processing requests received from mobile devices 110 and sending requested resources to the requesting mobile devices 110. In particular, the server 105 is configured to store metadata associated with one or more applications, wherein the metadata describes a number of characteristics associated with the application. The metadata may also comprise a URI for providing a link by which the application can be accessed.

In an alternative embodiment, an application can be stored on the server 105 along with the application's associated metadata. Applications or metadata may be located on a single server 105 or may be geographically spread across a number of different servers 105. The server 105 interacts with mobile devices 110 across a number of networks 115 namely, the internet, and for example, a wireless communication network. However, the network can be any type of network in which a server can interact with a plurality of mobile devices 110 and vice versa.

Mobile devices 110 send requests to the server 105 in order to access requested resources, such as applications. An application is a software component that is downloadable from a server 105 and installed on a mobile device 110 for further use. A mobile device 110 is a device which comprises computing capabilities that enable applications to be run based on a specific platform. The mobile device 110 may comprise mobile phone capabilities integrated with the computing capabilities described above. However, for the purposes of this disclosure any type of mobile device 110 is applicable and which is capable of accessing a network 115 in order to download and run applications.

Figure 2:
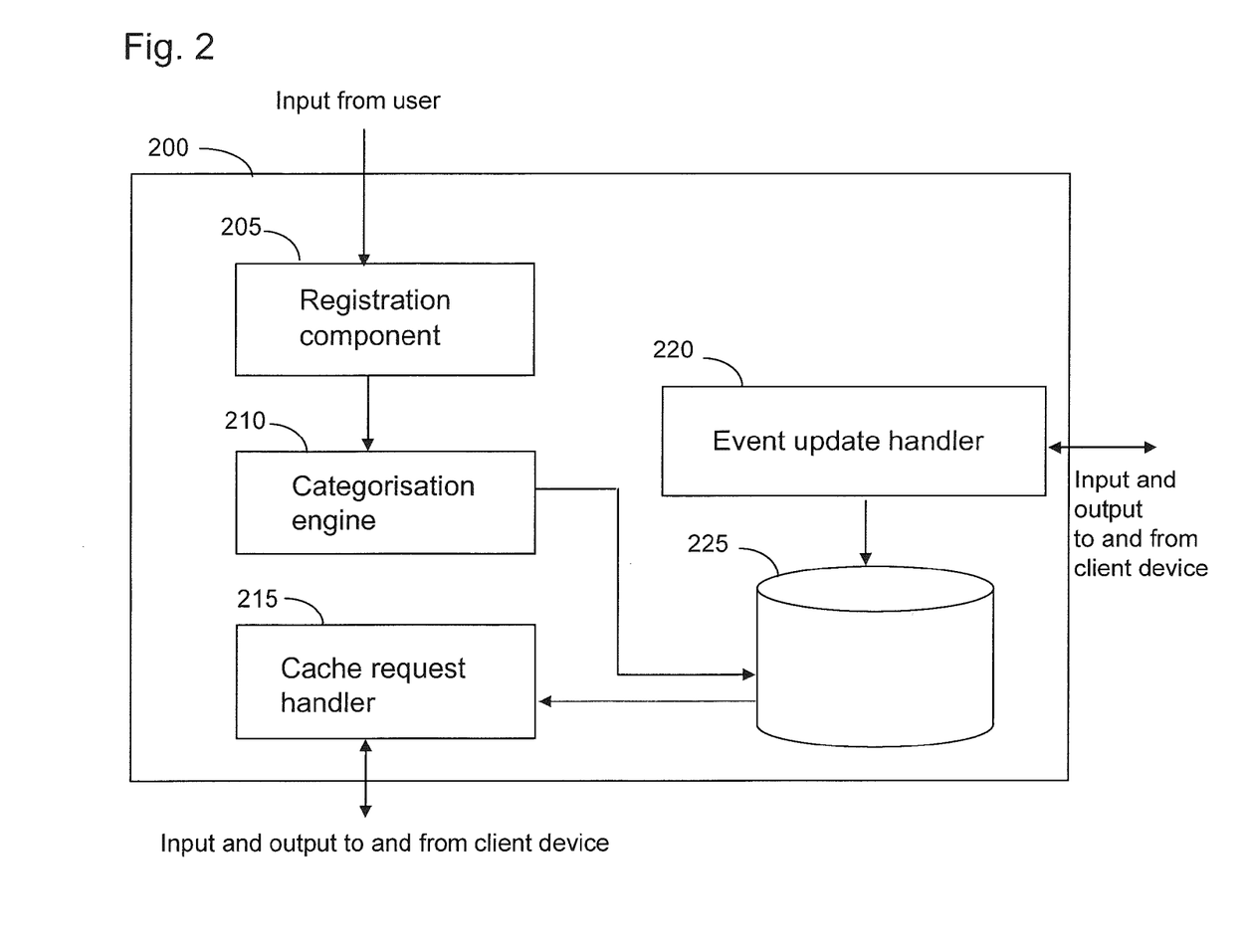
FIG. 2 is a block diagram illustrating a contextual application deployment component operable on a server in accordance with an embodiment of the present invention.

Referring now to FIG. 2, a context deployment component 200 comprising a registration component 205 for receiving metadata associated with an application is configured for storing the metadata on a server. The metadata comprises information that describes one or more characteristics about the application, for example, the title of the application, the genre of the application, the type of platform that the application will run on, a URI which states where the application can be located i.e. on another server, and information that describes a location or a geographical boundary or radius which is relevant to the application.

In exemplary embodiments, location information relevant to the application can take the form of a set of geofenced coordinates which identifies a virtual boundary for a defined geographical area. A geofenced area can be geographically generated as in a radius around a building or a particular location point. A geofenced area can also be a predefined set of boundaries. For example, if an application was a restaurant branch finder application, the geofenced area would be the geographical area in which a particular restaurant branch is located.

In exemplary embodiments, different types of applications may comprise different characteristics. For example, a 'what to do in your area' application may comprise metadata that identifies what activities are available depending on the weather conditions in the identified area of the mobile device. Therefore, a characteristic describes one or more conditions which describe the circumstances in which the application can be deployed (installed) or removed (uninstalled). In another embodiment, the registration component 205 may receive an application for storing along with its associated metadata.

A categorisation engine 210 analyses the received metadata and categorises the metadata into a number of conditions and stores this information in a cache store 225 for storage and retrieval purposes. Thus for each mobile device of type 'X', there is stored a list of the titles of applications along with the application's metadata that are suitable for running on the mobile device of type X.

In exemplary embodiments, a cache request handler 215 compiles a generic list of applications that can be run on each type of mobile device. The cache request handler 215 also requests environmental information from each mobile device requesting access to an application. Environmental information comprises information from various sensors installed within the mobile device or operable with the mobile device. One type of sensor can inform the mobile device of its current location by using triangulation techniques and is obtainable from a Master Switching Control (MSC) of a wireless communication system, or location information can be obtained from a GPS system for example. Another type of sensor, an accelerometer, can provide information with regards to the current speed of travel of the mobile device. Other types of sensors can detect temperature conditions, or whether the mobile device is operating within its optimal operating constraints.

Other types of information gathered can comprise the current date and time, the type of mobile device and the type of platform installed on the mobile device. From this information the cache request handler 215 determines applications that are currently relevant to the mobile device. For example, using the mobile device's location the cache request handler 215 determines one or more applications that have metadata which states that the application is for use in the determined location of the mobile device. This is achieved by the cache request handler 215 analysing the longitudinal and latitudinal coordinates of the location of the mobile device and comparing these references to a set of geofenced coordinates identified in metadata associated with each of the applications.

For, each set of the geofenced coordinates that are determined to be within the determined range of the set of coordinates of the mobile device the cache request handler 215 generates a list of applications which are suitable for use in the determined location and communicates the list of determined applications and the associated metadata to the requesting mobile device. In another embodiment the cache request handler 215 sets up a virtual radius or perimeter boundary around the determined location of the mobile device. For example, the virtual boundary may be a five mile radius around the determined mobile device's location.

An event handler component 220 receives location updates from each mobile device 110. These updates are received over a predetermined time period. The event handler component 220 communicates this information to the cache request handler 215 which maintains a log of each mobile device's location.

The cache handler component 215 determines the mobile device has moved either outside of the geofenced coordinates for a particular application or 'outside of' or 'on the edge of' the defined radius for a particular application. As the mobile device 'drops off' or 'moves into' an application's geofenced location the cache request handler 215 updates the list of applications and communicates the a new list detailing applications that are available in the new location to a cache update component of the mobile device.

The event handler component 220 also receives information concerning the usability of an application from mobile devices. The information may comprise a rating associated with how useful the application was and its relevance to a determined situation. The event handler component 220 passes this information onto the cache request handler 215 and the cache request handler 215 requests use of this information to determine which applications to include in the newly generated list. The list comprises the names and metadata of suitable applications rather than the applications themselves.

Figure 3:
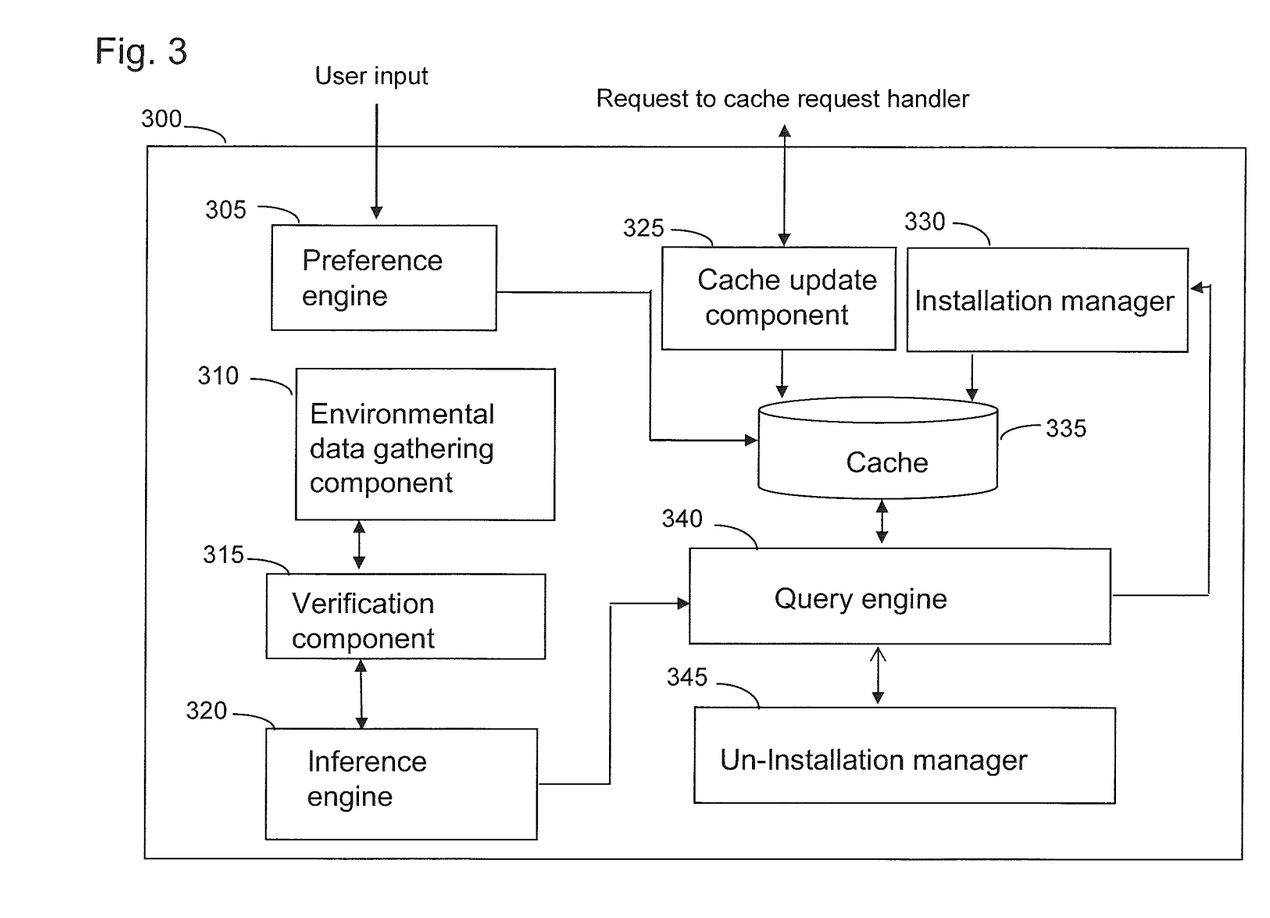
FIG. 3 is a block diagram illustrating a contextual verification component operable on a client device in accordance with an embodiment of the present invention.

In exemplary embodiments, the mobile device comprises a contextual verification component 300, as shown in FIG. 3, which interfaces with the contextual deployment application 200, as shown in FIG. 2, in order to determine when relevant applications should be installed on the mobile device and when the application should be removed from the mobile device, thereby only having applications installed on a mobile device that are relevant to a situation, location, a context etc. and/or and a given time period. A time period may be any time period from a few minutes to a few days etc.

When a mobile device initially registers with the contextual application deployment service, the cache request handler of the server communicates to the mobile device a list of applications that are available to the mobile device, in the mobile device's determined location. This list is received by the cache update component 325 and stored in a cache store 335.

In exemplary embodiments, the mobile device comprises an environmental data gathering component 310 which gathers information from various sensors installed within the mobile device or operable with the mobile device. One type of sensor can inform the mobile device of its current location by using triangulation techniques and is obtainable from a Master Switching Control (MSC) of a wireless communication system, another type of sensor, an accelerometer, can provide information with regards to the current speed of travel of the mobile device. Other types of sensors can detect heat and temperature conditions, or whether the mobile device is operating within its optimal operating constraints. In exemplary embodiments, other types of information gathered can comprise the current date and time, the type of mobile device and the type of platform installed on the mobile device.

A preference engine 305 receives and stores information about preferences associated with the user of the mobile device. Preferences may include a type of application a user is interested in, or a time period in which the user only wishes to receive applications for automatic installation. An example is when a user is on vacation and may only wish to receive applications of interest within their vacation period.

A verification component 315 communicates and interfaces with the environmental data gathering component 310. The verification component periodically checks for updates to the environmental data collected by the environmental data gathering component 310, for example, the mobile device is at a different location or is travelling at a faster or slower speed.

An inference engine 320 determines, based on a current speed and location for example, the operating environment that the mobile device may currently operating in. For example, using information supplied by an accelerometer, a determination can be made that the mobile device is travelling at 80 mph and using information obtained from the MSC or a GPS system, which the mobile device is currently at location 'Winchester South'. A further lookup is performed to determine 'points of location' in a digital map and can infer from this information that, for example, the mobile device is travelling on a train. In exemplary embodiments, an inference engine 320 creates a set of filters from the above information generated from the mobile device and user generated preference information. For example, in addition to the above device information, the user of the mobile device may have set a preference of 'Only show me restaurants between the times of 12:00 and 13:00 on Monday to Friday'. The totality of information creates a filter or a query set in which to use to query the cache 335 on the mobile device.

A query engine 340, using the created filter, queries the list of application in the cache store for all applications that meet the set of conditions as set out in the created filter or query set. In exemplary embodiments, the query engine 340 communicates a result set to the inference engine 320 for further analysis. For example, if the user is travelling on a train, the inference engine 320 from the information received from the environmental data gathering component 310 infers that the mobile device is travelling on a train in a particular direction. Therefore, the user of the mobile device does not want to receive applications relating to restaurants that the train is travelling past; rather the user will only wish to receive applications that relate to food service facilities on the train. Such an application may allow a user to order food and drinks from their seat on the train and have their order delivered to them.

Once the inference engine 320 has analysed the list of available applications and each available application's associated metadata in combination with the created filter, the inference engine 320 returns to an installation manager 330 details of the application that has been identified as of relevance to the situation that the mobile device is currently determined to be in.

The installation manager 330 determines from the metadata associated with the identified application, a URI which indicates a location where the application can be downloaded from. The installation manager 330 communicates a request to the server 105 which is identified in the URI requesting access to the identified application for downloading and installing on the mobile device. The installation manager 330 also manages all authentication requests that the server requires in order to download the application. When the application is downloaded, the mobile device may generate an alert to notify the user, of the mobile device, that an application has been installed and is ready for use.

In another example, the inference engine 320 may return a list of a plurality of applications that are available for downloading to the mobile device. The user is prompted to select one of the applications from the list and the selection is communicated to the installation manager 330 for downloading.

A feedback mechanism is provided wherein the user can vote on the usefulness of the application. This information is fed back to the inference engine 320 and the cache request handler 215 (FIG. 2) which is able to use this information to make more informed inferences in the future. For example, if the user gave feedback stating that the application was of no relevance or not particularly useful then the inference engine 320 may not include this application in the list of applications to be downloaded.

As already stated the verification component 315 is periodically checking for updates to location information and updates to information provide by the sensors associated with the mobile device. If the verification component 315 identifies that the location information and/or the sensor information has changed, the verification component 315 communicates this information to the inference engine 320 for further analysis.

The verification component 315 also transmits updated location information to the event handler component 220 (FIG. 2) of the server in order for the cache request handler to determine whether a new list of applications and their associated metadata needs to be generated and communicated to the mobile device. The inference engine 320 analyses the received information and determines whether the mobile device is still located within the geofenced range of the application installed on the mobile device.

If a determination is made that the application is still within the geofenced range the application is determined as still relevant and no further action is taken. However, if it is determined that the application is not with the geofenced range then a communication is sent to an un-installation manager 345 and the application is automatically uninstalled from the mobile device.

In another embodiment an application could be determined as no longer relevant to a mobile device because the application has an assigned validity period and the validity period has been determined as to of expired.

In exemplary embodiments, the verification component 315 continuously determines whether any updates have been received with respect to environmental data, and communicates updates to the inference engine 320 for analysis. If the inference engine 320 detects that, because on a new location of a mobile device that an application is not relevant and the application is uninstalled, new relevant applications are detected and one or more of these applications are downloaded and installed on the mobile device.

In another embodiment, the mobile device is configured to receive a generic list from the server, the generic list being a list of all applications that are available for the type of mobile device. The mobile device is configured to analyse the generic list of application reviewing each of the application's metadata to determine whether one or more applications are relevant to the location that the mobile device is determined to be in. The mobile device generates a new list, which is a subset of the generic list detailing only those applications that are relevant in the determined location of the mobile device. Further analysis is undertaken to determine, based, on the user's preferences whether there are any applications in the list that meet location and preference requirements. If such an application is located, the name of the application and the URI of the application are communicated to the installation manager for downloading from the location identified by the URI and installing on the mobile device. Thus, in the above embodiment the server only transmits a new list to a mobile device when new applications, updates to metadata or notifications of new applications stored elsewhere are received by the server.

Figure 4:
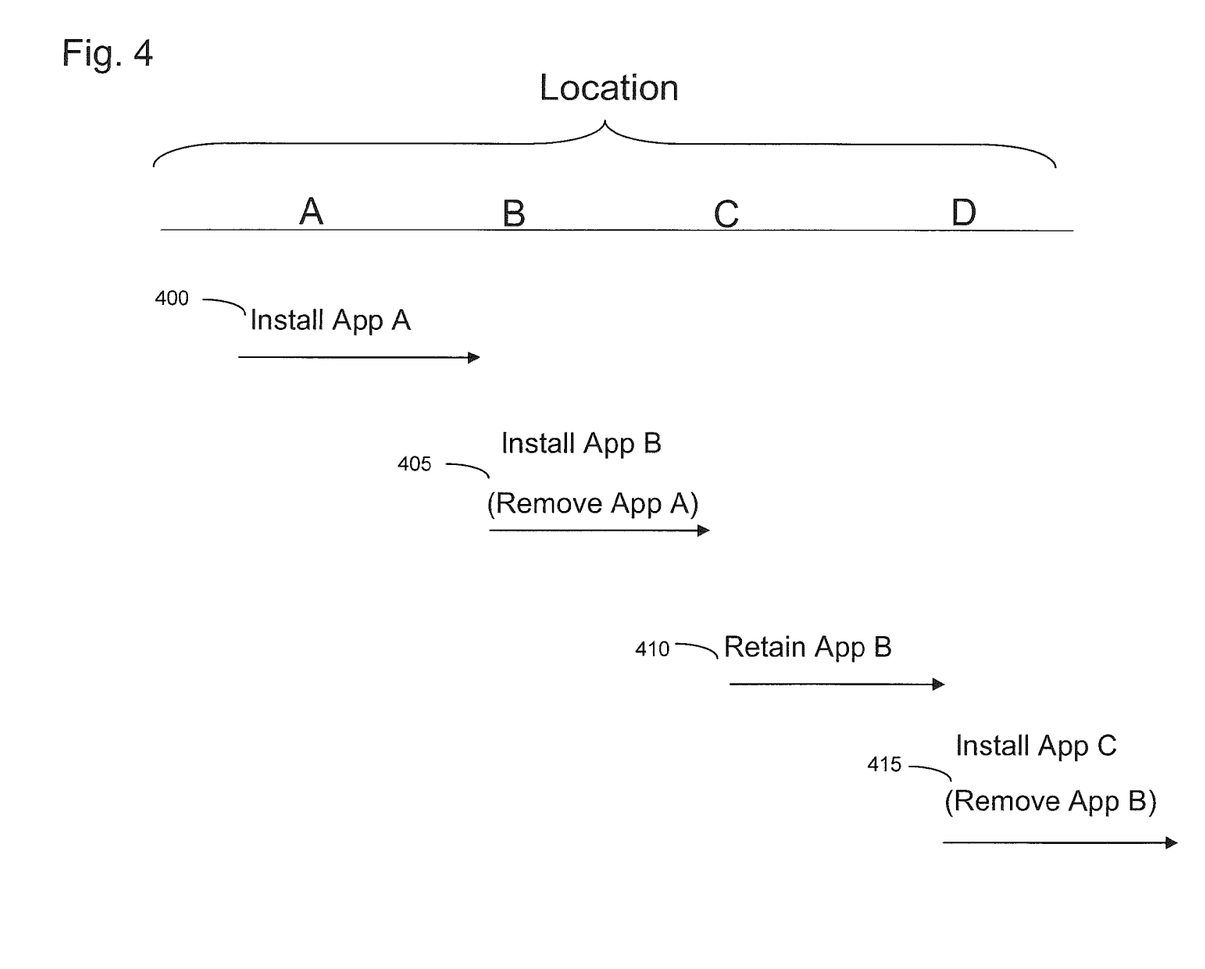
FIG. 4 is a timing diagram illustrating the method of a client device moving from one situation to another in accordance with an embodiment of the present invention.

Referring now to FIG. 4, a timing diagram illustrating the method of a client device moving from one situation to another in accordance with an embodiment is shown A mobile device is determined as travelling through a location A and a list of applications that are available to the mobile device, in the mobile device's current location is communicated to the mobile device for further analysis. After determining the mobile device's current location, environmental data gathered form sensors on the mobile device, and user preferences, a determination is made that App A is relevant to the mobile phone operating environment. An operating environment is an inferred situation that the mobile phone finds itself in, for example, travelling on a train, travelling in a car, at a theme park or on a boat etc. App A in downloaded and installed on the mobile device.

The application may have a determined time period of validity for example, App A may be a restaurant menu and once the mobile device is within a predefined distance to the restaurant, a determination is made as to whether the mobile device is located near the restaurant and within a time period that is the same as the period of time as determined in the validity period. For example, the validity period may be the opening times of the restaurant. If the mobile device is near the restaurant and the restaurant is open, the mobile device downloads the application, as shown at step 400.

Further determinations are made, as often as many times a minute, to identify the mobile device's current location and the mobile device's situation, for example, the mobile device is identified at location B and travelling at a determined speed. The same process as above is carried out but this time it is determined that App B is of relevance, but App A is no longer required. Therefore, App A is uninstalled from the mobile device and App B is installed as shown at step 4005. The mobile device may be identified as travelling on a train moving from location B towards location D via location C. A determination is made that App B is still relevant, for example, because App B is a café finder application and the only café available to the user is the food cart on the train. Therefore App B is retained on the mobile device and no other applications are determined of relevance as shown at step 410. As the train comes to the end of its journey at location D, App B is no longer of any relevance and therefore App B is uninstalled from the mobile device. However, because of the mobile device's new location App C is determined to be of relevance and App C is downloaded and installed onto the mobile device as shown at step 415.

Figure 5:
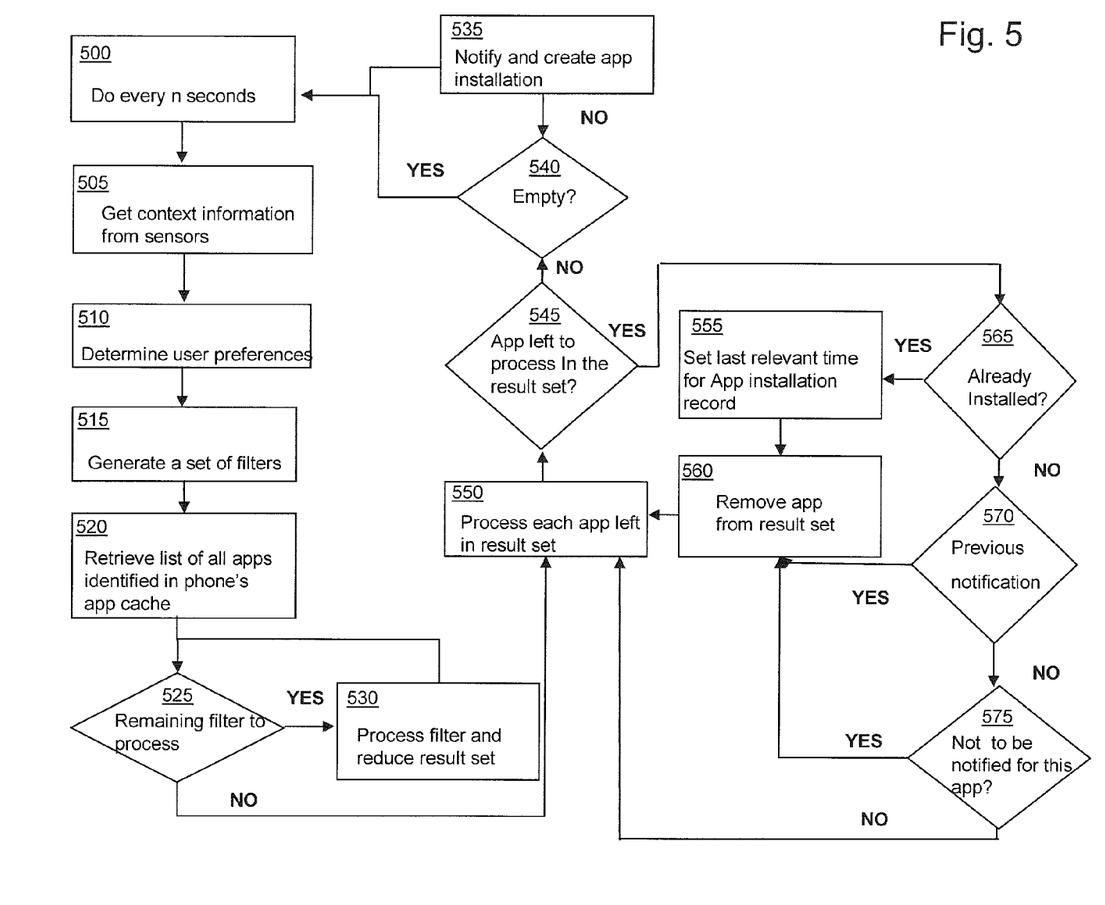
FIG. 5 is a flow chart illustrating a method of operation of a contextual verification component of a client device in accordance with an embodiment of the present invention.

Referring now to FIG. 5, a flow chart illustrating a method of operation of a contextual verification component of a client device in accordance with an embodiment is shown.

As shown at blocks 500 and 505, the verification component, periodically, requests environmental data from the environmental data gathering component. At block 510, the preference engine 305 determines a user's preference with respect to what types of applications they wish to use of their mobile device. At block 515, a set of filters are generated based on all of the above gathered information. At block 520, the verification component retrieves a list of applications that are available for use in the mobile device's current location, from the mobile device's application cache. A process (blocks 525 and 530) is then initiated by which the filters are used as a set of queries in order to filter out applications that don't meet the criteria as identified in the set of queries.

Each condition within the filter will identify an application; and the output is a result set listing a number of applications. Further filters are applied to the result set at block 550 in order to further filter out applications of no relevance to the current location and determined operating environment. A determination is made at block 545 as to whether there are any applications left to process in the result set. If the determination is negative at block 535, the remaining application is accessed, downloaded and installed.

If at block 545, there are further applications to process, a check is made at block 565 to determine whether the application is already installed on the mobile device. If the determination is positive, a flag is raised to set the last relevant time that the application was installed in the mobile device and to determine whether the application has a set validity period. If a validity period is determined as to have expired, the application is removed from the results set.

Moving back to block 565, a further determination is made at block 570 to determine if a previous notification was raised for the application and if the determination is negative, then no further notification is to be raised for the application. If the determination is positive at block 570, then the application is removed from the result set.

Figure 6:
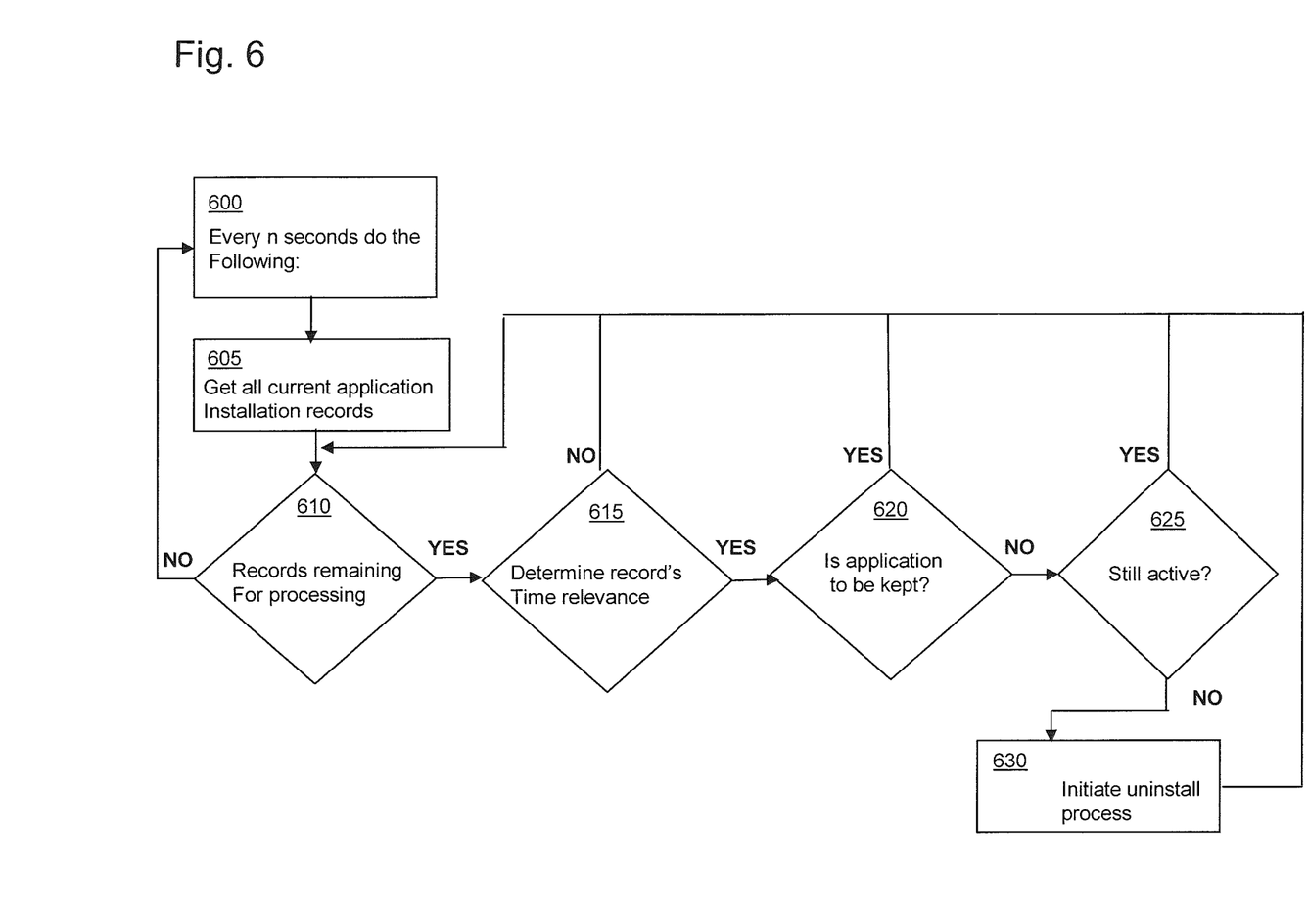
FIG. 6 is a flow chart illustrating a method of un-installation component of the client device in accordance with an embodiment of the present invention.

Referring now to FIG. 6, a flow chart illustrating a method of un-installation component of the client device in accordance with an embodiment is shown. At block 600 and block 605, the uninstallation manager periodically requests installation records for all applications installed on the mobile device. At block 610, a determination is made as to whether there are any records to process. If the determination is negative, control returns to block 600. If the determination is positive, control passes to block 615 and a determination is made as to the application's installation record's time validity. A further determination is made as to whether the application is to be retained on the mobile device or removed 620.

If the application is determined to be within the validity window and still relevant to the operating environment that the mobile device finds itself in, (or active on the device 625) then the application is retained, otherwise at block 630, the application is removed from the mobile device.

Whilst the above embodiment has been described in terms of the server and the mobile device both carrying out filtering and analysis steps in order to determine an application that is contextually relevant to the mobile device, a person skilled in the art will realise that any of the above processing steps are able to be carried out entirely on a server. Thus, the server would transmit to a requesting mobile device, an application that is determined relevant to the mobile device's operating environment.

The invention claimed is:

1. A method of deploying a contextually dependent application on a mobile device, the method comprising:
   determining a current location of the mobile device;
   gathering environmental data from the mobile device wherein, the environmental data comprises data gathered from an accelerometer to determine the speed at which the mobile device is travelling;
   inferring from the current location of the mobile device and the gathered environmental data an operating environment of the mobile device, wherein the inferring includes determining whether the mobile device is traveling at a speed greater than a threshold value and identifying a particular mode of transportation as the operating environment of the mobile device based on determining that the mobile device is traveling at the speed greater than the threshold value and the current location of the mobile device;
   receiving a list of applications, wherein the list of applications comprises a metadata for each application;
   analyzing the metadata to identify an application that comprises characteristics that are compatible with the operating environment of the mobile device;
   comparing the identified application with user preferences to determine whether installing the identified application on the mobile device complies with the user preferences;
   installing the identified application on the mobile device responsive to determining that the identified application on the mobile device complies with the user preferences;
   receiving an input from the mobile device including feedback from the user indicating whether the application was useful to the user,
   determining a second current location of the mobile device;
   inferring from the second current location of the mobile device and the gathered environmental data a second operating environment of the mobile device;
   uninstalling the identified application from the mobile device based on determining that the characteristics of the identified application are not compatible with the second operating environment of the mobile device; and
   updating the list of applications to remove the identified application from the list of applications responsive to receiving feedback from the user that indicates that the application was not useful to the user.

2. A method as claimed in claim 1, wherein an application comprises a predetermined geographical radius and the method further comprises uninstalling the identified application from the mobile device based on determining that the mobile device is outside of the geographical radius.

3. A method as claimed in claim 1, wherein the environmental data is gathered from sensors operable on the mobile device.

4. A method as claimed in claim 3, wherein, the environmental data comprises data gathered from temperature sensors to determine a temperature of the operating environment which the mobile device is operating in.

5. A method as claimed in claim 1, further comprising on detecting a new location of the mobile device, determining a further application that comprises characteristics that are compatible with the operating environment of the mobile device.

6. A method as claimed in claim 1 wherein the received metadata comprises information concerning a time period in which the application is valid for.

7. A method as claimed in claim 1 wherein, the inferring further comprises determining a validity period for an application and further inferring from the validity period, the location of the mobile device and gathered environmental data, further determining whether an application is compatible with the operating environment of the mobile device.

8. A method of deploying a contextually dependent application on a mobile device, the method comprising:
   determining a current location of the mobile device;
   gathering environmental data from the mobile device wherein, the environmental data comprises data gathered from an accelerometer to determine the speed at which the mobile device is traveling;
   inferring from the current location of the mobile device and the gathered environmental data an operating environment of the mobile device, wherein the inferring includes determining whether the mobile device is traveling at a speed greater than a threshold value and identifying a particular mode of transportation as the operating environment of the mobile device based on determining that the mobile device is traveling at the speed greater than the threshold value and the current location of the mobile device;
   receiving a list of applications, wherein the list of applications comprises a metadata for each application;
   analyzing the metadata to identify an application that comprises characteristics that are compatible with the operating environment of the mobile device;
   comparing the identified application with user preferences to determine whether installing the identified application on the mobile device complies with the user preferences, wherein the user preference includes a time period when installing applications is permitted;
   installing the identified application on the mobile device responsive to determining that the identified application on the mobile device complies with the user preferences and the time period when installing applications is permitted is a current time period;
   determining a second current location of the mobile device;
   inferring from the second current location of the mobile device and the gathered environmental data a second operating environment of the mobile device;
   receiving an input from the mobile device including feedback from the user indicating whether the application was useful to the user;
   uninstalling the identified application from the mobile device based on determining that the characteristics of the identified application are not compatible with the second operating environment of the mobile device; and
   updating the list of applications to remove the identified application from the list of applications responsive to receiving feedback from the user that indicates that the application was not useful to the user.

9. A method as claimed in claim 8, wherein an application comprises a predetermined geographical radius and the method further comprises uninstalling the identified application from the mobile device based on determining that the mobile device is outside of the geographical radius.

10. A method as claimed in claim 8, wherein the environmental data is gathered from sensors operable on the mobile device.

11. A method as claimed in claim 10, wherein, the environmental data comprises data gathered from temperature sensors to determine a temperature of the operating environment which the mobile device is operating in.

12. A method as claimed in claim 8, further comprising on detecting a new location of the mobile device, determining a further application that comprises characteristics that are compatible with the operating environment of the mobile device.

13. A method as claimed in claim 8, wherein the received metadata comprises information concerning a time period in which the application is valid for.

14. A method as claimed in claim 8, wherein, the inferring further comprises determining a validity period for an application and further inferring from the validity period, the location of the mobile device and gathered environmental data, further determining whether an application is compatible with the operating environment of the mobile device.

* * * * *